United States Patent

Matsuo et al.

[11] Patent Number: 5,989,710
[45] Date of Patent: *Nov. 23, 1999

[54] MOLDING MATERIAL FOR THERMOPLASTIC COMPOSITES

[75] Inventors: Tatsuki Matsuo; Toshiaki Hokudoh; Kuniharu Mori; Yoshinobu Takahashi; Takeru Toida; Hiroshi Kawada, all of Ohtsu, Japan

[73] Assignee: Toyo Boseki Kabushiki Kaisha, Osaka, Japan

[*] Notice: This patent is subject to a terminal disclaimer.

[21] Appl. No.: 07/424,402

[22] Filed: Oct. 20, 1989

[30] Foreign Application Priority Data

Oct. 21, 1988 [JP] Japan .................................. 63-266637
Nov. 10, 1988 [JP] Japan .................................. 63-285391
Dec. 27, 1988 [JP] Japan .................................. 63-333003
Dec. 27, 1988 [JP] Japan .................................. 63-333004

[51] Int. Cl.$^6$ .................................................. D02G 3/00
[52] U.S. Cl. .......................... 428/369; 428/357; 428/359; 428/369; 428/370; 428/371; 428/373; 156/166; 156/196

[58] Field of Search ................................. 428/398, 245, 428/357, 359, 369, 370, 371, 373; 156/166, 196

[56] References Cited

U.S. PATENT DOCUMENTS 4,037,011  7/1977  Hattori et al. ......................... 428/398
4,800,113  1/1989  O'Connor ............................... 428/175

Primary Examiner—Rick Weisberger
Attorney, Agent, or Firm—Leydig, Voit & Mayer, Ltd.

[57] ABSTRACT

A molding material for thermoplastic composites is provided. The molding material is prepared from a commingled yarn containing continuous thermoplastic fibers and continuous reinforcing fibers, in a form of threads, textile fabrics, knitted fabrics, or multiaxial laminated fabrics, wherein the fiber commingling parameter of said continuous reinforcing fibers in said commingled yarn is 20% or more, and wherein the orientation index after heat treatment of said continuous thermoplastic fibers is 0.3 or more, and/or the thermal shrinkage ratio of said continuous thermoplastic fibers is 15% or less.

15 Claims, 2 Drawing Sheets

MOLDING MATERIAL FOR THERMOPLASTIC COMPOSITES

BACKGROUND OF THE INVENTION

1. Field of the Invention

The present invention relates to a molding material for use in the preparation of thermoplastic composites containing continuous reinforcing fibers in a thermoplastic resin matrix. In particular, the present invention relates to a molding material formed with commingled yarn containing continuous thermoplastic fibers as well as continuous reinforcing fibers. Furthermore, the present invention also relates to a pelletized molding material for use in the preparation of thermoplastic composites. The reinforcing fibers in the pelletized molding material are aligned in a longitudinal direction within a thermoplastic resin matrix of the molding material. Moreover, the present invention concerns a process for the preparation of thermoplastic composites using the aforementioned molding material.

2. Description of the Prior Art

Existing plastic composites containing reinforcing fibers include the so-called "advanced composites" employed for the manufacture of products used in the aviation and space industries as well as the general purpose fiber reinforced plastics (FRP) used in shipbuilding, for bathtub units and in automobiles, etc. In both of these composites, thermosetting resins are ordinarily employed as matrix resins, usually epoxy resins in the former type and unsaturated polyester resins in the latter. If thermosetting resins are used as the matrix, then hardening treatment is necessary in order to harden the matrix resin, moreover, the composites so obtained lack toughness. On the other hand, it is known that improvement with respect to the aforementioned shortcomings can be achieved by using thermoplastic resins for the matrix resins. Furthermore, composites with excellent impact resistance and fatigue resistance can be obtained by using, for example, glass fibers of a length of 3 mm or more as the reinforcing fibers. However, the melting temperature of thermoplastic resins is high, and therefore high temperatures and high pressures are required in order to impregnate long reinforcing fibers with the molten resin. Since the impregnation of molten resin into a long-fiber mat with randomly oriented fibers is relatively easy, composites are ordinarily obtained by impregnating such mats with a thermoplastic resin and then thermoforming these resin-impregnated mats. However, when this method is employed, a high content of reinforcing fibers cannot be achieved, and therefore the mechanical properties of the resulting composites are inadequate.

With the purpose of solving this problem, Japanese Laid-Open Patent Publication Nos. 60-209034 and 61-130345 disclose processes for the manufacture of molding materials for composites by commingling continuous reinforcing fibers with continuous thermoplastic fibers. These molding materials are molded into composites by techniques such as hot pressing, pultrusion and filament winding, and permit the formation of composites with irregular surfaces. These processes also make possible a marked increase in the reinforcing fiber content of manufactured thermoplastic resin composites as compared with processes based upon impregnation of fiber mats with molten resins. Nevertheless, even when these types of molding materials are employed, adequate quantities of thermoplastic resin cannot be impregnated into the continuous reinforcing fibers when thermoforming is carried out, and consequently the composites so obtained lack toughness. Therefore, a molding material such that the continuous reinforcing fibers are impregnated with a sufficient quantity of thermoplastic resin during the thermoforming process and which thereby provides thermoplastic composites with excellent mechanical properties is desirable.

SUMMARY OF THE INVENTION

A molding material for thermoplastic composites of this invention, which overcomes the above-discussed and numerous other disadvantages and deficiencies of the prior art, is prepared from a commingled yarn containing continuous thermoplastic fibers and continuous reinforcing fibers, in a form of threads, textile fabrics, knitted fabrics, or multiaxial laminated fabrics, wherein the fiber commingling parameter of said continuous reinforcing fibers in said commingled yarn is 20% or more, and wherein the orientation index after heat treatment of said continuous thermoplastic fibers is 0.3 or more, and/or the thermal shrinkage ratio of said continuous thermoplastic fibers is 15% or less.

In a preferred embodiment, to 100 parts by weight of the continuous reinforcing fibers, 0.05 to 0.5 parts by weight of a processing agent are applied.

In a preferred embodiment, the continuous thermoplastic fiber is a crimped fiber.

In a preferred embodiment, the continuous thermoplastic fiber is a polyester fiber or polyamide fiber.

In a preferred embodiment, the continuous reinforcing fiber is a glass fiber.

A method for preparing thermoplastic composites of this invention by the use of the abovementioned molding material comprises the steps of: arranging at least one of said molding materials so that said continuous reinforcing fibers are mutually oriented in a multiaxial manner; and thermoforming said material at a temperature above the melting point of said continuous thermoplastic fibers therein.

A pelletized molding material for thermoplastic composites of this invention comprises a thermoplastic resin matrix and continuous reinforcing fibers dispersed therein, wherein said continuous fibers are aligned in the longitudinal direction of said pellet; said continuous reinforcing fibers are contained in said pellet at a rate of 30% by weight or more based on the total weight of said pellet; the dispersion rate of said continuous reinforcing fibers is 20% or more; the microvoid density index of said pellet is 5 or more; the macrovoid density index of said pellet is 80 or less; and the length of said pellet in the longitudinal direction is 3 to 60 mm.

In a preferred embodiment, the pelletized molding material is prepared by heating a plurality of strands composed of at least one commingled yarn containing continuous thermoplastic fibers and continuous reinforcing fibers so that said thermoplastic fibers are melted, and then cutting the resulting material to the prescribed dimension after said thermoplastic resin is solidified, the fiber commingling parameter of said continuous reinforcing fibers in said commingled yarn being 20% or more, and the orientation index after heat treatment of said continuous thermoplastic fibers being 0.3 or more, and/or the thermal shrinkage ratio of said continuous thermoplastic fibers being 15% or less.

Thus, the invention described herein makes possible the objectives of: (1) providing a molding material for preparing thermoplastic composites with excellent impact and fatigue resistance; (2) providing a molding material containing multiple reinforcing fibers of adequate length, and such that the said multiple reinforcing fibers are aligned in a prescribed direction, which allows the fabrication of thermoplastic composites with the excellent characteristics stated above by thermoforming of the said molding material; (3) providing a pelletized molding material with the excellent characteristics stated above; (4) providing a molding material for the aforementioned thermoplastic composites such that the application of heat fuses the thermoplastic resin contained in the said molding material and thereby causes highly effective impregnation of the reinforcing fibers by the said resin; and (5) providing a method for the manufacture of tough and durable thermoplastic composites by use of the superior type of molding material referred to above.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
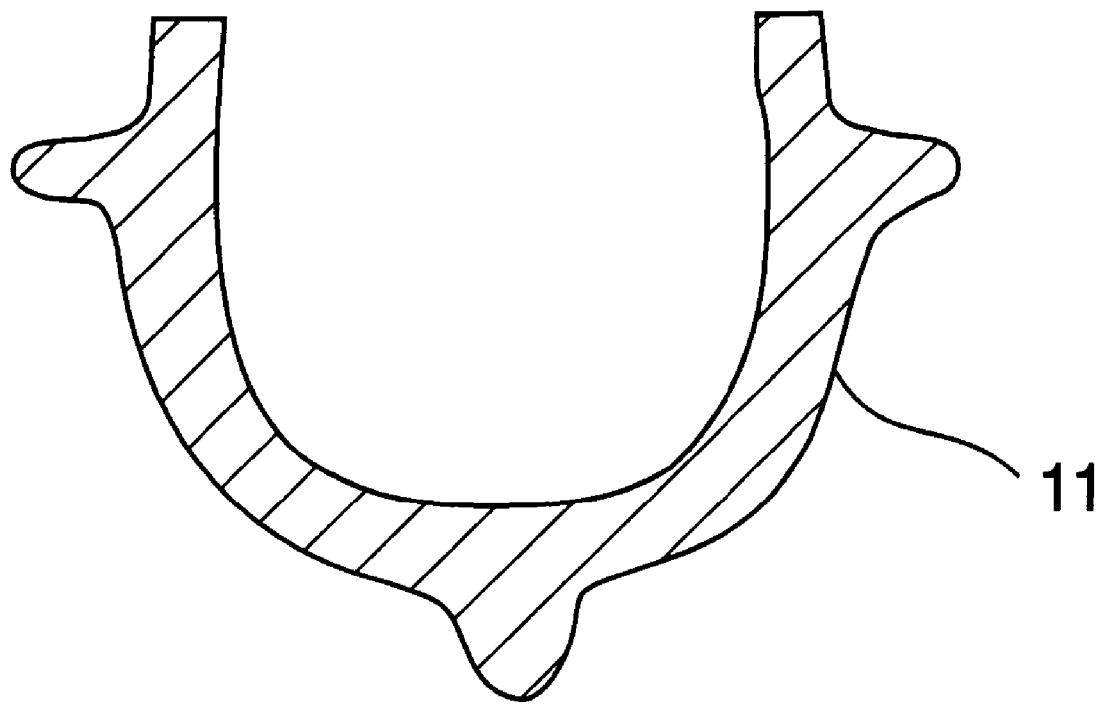
FIG. 1 is a sectional view of one example of the continuous crimped thermoplastic fiber used in the molding material for thermoplastic composites of the present invention.

The definitions of the terms "orientation index after heat treatment δn" and "thermal shrinkage ratio" of a continuous thermoplastic fiber, "fiber commingling parameter" of a commingled yarn, "dispersion rate" of the reinforcing fibers contained in a pelletized molding material for thermoplastic composites, and the "microvoid density index" as well as "macrovoid density index" of the pelletized molding material for thermoplastic composites are as follows.

The orientation index after heat treatment δn of a continuous thermoplastic fiber is defined by the following formula:

$$\delta n = (n_b - n_a)/n_b$$

wherein, $n_a$ denotes the degree of orientation of the continuous thermoplastic fibers used in the molding material and $n_b$ denotes the degree of orientation of these fibers after heat treatment at a temperature 20° C. below the melting point of the said resin while maintaining these fibers at a constant length. The larger the value of the orientation index after heat treatment δn, the less the change in the molecular orientation that forms the fibers during the interval required for the molecules to reach an unoriented state when the fibers are melted, which implies that a molten state is attained in a relatively shorter time. Therefore, when a commingled yarn that contains continuous thermoplastic fibers with a large orientation index after heat treatment is heated during thermoforming processes, the thermoplastic fibers melt and impregnate the continuous reinforcing fibers rapidly.

The thermal shrinkage ratio is the value of the maximum thermal shrinkage ratio measured in accordance with the dry thermal shrinkage procedure B specified in JIS-L-1013. This maximum thermal shrinkage ratio is the maximum value of the dry thermal shrinkage ratio attained when the temperature to heat the test material is varied and the dry thermal shrinkage ratio is plotted against the temperature. The dry thermal shrinkage procedure B specified by JIS-L-1013 is as follows. In this procedure, the heating temperature is to be regulated with an accuracy of ±1° C.

One end of a sample yarn is fixed and a prescribed load is applied to the other end. Then, arbitrary positions on the yarn are marked at intervals of 500 mm. Next, the said load is removed from the sample, which is then left suspended vertically for 30 minutes in a dryer at a prescribed heated temperature, and then removed from the dryer and cooled to room temperature. Next, one end of the sample is fixed, a load is again applied to the other end as indicated above, and the distance l(mm) between two of the aforementioned marked points is measured. Using this measurement, the dry thermal shrinkage ratio is calculated from the following formula:

$$\text{Dry thermal shrinkage ratio } (\%) = \frac{500 - l}{500} \times 100$$

This test is repeated five times and the result is expressed by the average of the five measurements.

The fiber commingling parameter is calculated from the following formula:

$$\text{Fiber commingling parameter} = \sum_{X=1}^{N} \frac{100(N - X)}{N - 1} \times \frac{NcX}{\frac{N}{X}}$$

wherein, N denotes the total number of continuous reinforcing fibers contained in the commingled yarn, NcX denotes the number of groups of continuous reinforcing fibers present in the commingled yarn when the reinforcing fibers are distributed into such groups, and X denotes the number of continuous reinforcing fibers in a specified group among these groups. In the above formula, the fraction $100(N-X)/(N-1)$ signifies the fiber commingling state of the commingled yarn. Thus, the smaller is the value of X, the better the commingling state of fibers in the yarn becomes. For example, when X equals to 1, the above-mentioned fraction amounts to 100, indicating that the commingling state of fibers is best. The quantity NcX/N/X represents the degree of importance of the continuous reinforcing fibers for the visual effects in the entire commingled yarn, that is, a "weighing factor" used in the statistical analysis.

The dispersion rate, which constitutes an index of the state of dispersion of the reinforcing fibers contained in the pelletized molding material for thermoplastic composites of the present invention, is determined as follows. First, the cross-section of the pellet is observed under an optical microscope at a magnification of 200×, the total number of reinforcing fibers observed in a single view field is denoted by N, and the number of reinforcing fibers in contact with the thermoplastic resin matrix is denoted by n. Then, denoting the value of the quotient $(n/N) \times 100$ by Xi, the average of the values of Xi for five view fields is calculated and this datum is recorded as the dispersion rate of reinforcing fibers. If the dispersion rate is small, then continuous reinforcing fibers appear on the surface of the composite, and consequently the smoothness of the composite surface displays a pronounced deterioration and the strength of the composite also drops.

The microvoid density index of the pelletized molding material for thermoplastic composites is determined as follows. First, the cross-section of the pellet is observed under an optical microscope at a magnification of 200×, the number of voids with maximum diameter being 1 to 5 μm per unit area in a single view field is denoted by ni, and the sum $$\sum_{i=1}^{10} ni$$

of these numbers for ten view fields is recorded as the microvoid density index. If the microvoid density index is large, then the flexural modulus of the pellet is low, consequently, the pellet is easily bent. Therefore, and during processing, the continuous reinforcing fibers contained in the pellet are less susceptible to breaking while the pellet is in transit from the inlet of the extruder screw to the melt zone.

The macrovoid density index of the pelletized molding material for thermoplastic composites is determined as follows. First, the cross-section of the pellet is observed under an optical microscope at a magnification of 20×, the number of voids with maximum diameter exceeding 100 μm per unit area in a single view field is denoted by Ni, and the sum ΣNi of these numbers for ten view fields is recorded as the macrovoid density index. If the macrovoid density is large, then the proportion of voids (air bubbles) in the molded products is correspondingly large. These voids may cause the destruction of the product, so that the flexural modulus and other desirable physical parameters will be reduced.

The materials for continuous thermoplastic fibers which are appropriate for use in the present invention include, for example, polyamides such as nylon 6, nylon, 6,6, etc., polyesters such as polyethylene terephthalate, polybutylene terephthalate, etc., polyolefines such as polyethylene, polypropylene, etc., polyphenylene sulfides and polyether etherketones, etc. Polyester or polyamide fibers are especially suitable, but the selection of fibers is by no means restricted to these types.

The orientation index after heat treatment of the aforementioned continuous thermoplastic fibers should be at least 0.3. Such continuous thermoplastic fibers are easily melted by heating, consequently during the molding process, the impregnation of the continuous reinforcing fibers by the thermoplastic resin proceeds while the commingled state of fibers is maintained. Therefore a desirable state of impregnation is obtained. More preferably, the orientation index after heat treatment of the continuous thermoplastic fibers should be 0.5 or more.

Instead of using continuous thermoplastic fibers with the specified orientation index after heat treatment, continuous thermoplastic fibers with a prescribed thermal shrinkage ratio (not exceeding 15%) may also be used. Preferably, thermoplastic fibers with a thermal shrinkage ratio not exceeding 10% and more preferably not exceeding 5% should be used. These should not be short fibers, but should be of essentially continuous form. The thermal shrinkage ratio of the continuous reinforcing fibers that will be described below is generally small. Thus, if the thermal shrinkage of the thermoplastic fibers is 15% or less, then the difference in thermal shrinkage ratios between the thermoplastic fibers and the continuous reinforcing fibers is small, and hence the thermoplastic fibers can be melted without disarranging the commingled fiber configuration. Therefore, the continuous reinforcing fibers can be impregnated with the thermoplastic resin in a desirable form. If the thermal shrinkage ratio exceeds 15%, then the intermixed arrangement of the continuous reinforcing fibers and the thermoplastic fibers changes during the thermoforming processes, and therefore adequate impregnation of resin cannot be achieved. Consequently, spots (i.e., irregularities) caused by insufficient resin impregnation appear in the composite products obtained from the molding material, so that the mechanical properties and the appearance of the products are degraded.

The use of continuous thermoplastic fibers formed from crystalline polymers, with a degree of crystallization not exceeding 10%, is most desirable. The degree of crystallization can be determined, for example, by measuring the density of the fibers by the density gradient method, and then calculating the required value from the density of the crystalline portions (which is determined by the crystal structure analysis) and the density of the noncrystalline portions (which is obtained from rapidly cooled samples). The degree of crystallization can also be determined by the X-ray analysis.

Materials such as polyethylene terephthalate and nylon 6, etc., are widely used for continuous thermoplastic fibers. The degree of crystallization of polyethylene terephthalate fibers, for example, can be determined as follows. First, the density of the fibers is measured by the density gradient method using mixtures of carbon tetrachloride and xylene. Assuming that the densities of the crystalline and noncrystalline portions are 1.445 g/cm$^3$ and 1.335 g/cm$^3$, respectively, the volume fraction can be calculated, and the degree of crystallization can then be determined from this value. If the degree of crystallization of the continuous thermoplastic fibers exceeds 10%, then the fusion energy is large and consequently a large quantity of heat is necessary for melting the fibers In order to ensure a satisfactory commingling configuration with respect to the continuous reinforcing fibers, the diameter of these thermoplastic fibers should preferably be of the same order of magnitude as the diameter of the continuous reinforcing fibers.

Furthermore, these continuous thermoplastic fibers may desirably possess a crimp. Since the area of contact between individual crimped fibers is relatively small, the apparent frictional force between fibers is low and therefore opening is facilitated, consequently, a satisfactory state of commingling with the continuous reinforcing fibers is obtained.

Methods of imparting a crimp to the fibers include that of spinning the fibers with a noncircular cross-section. FIG. 1 shows an example of a continuous thermoplastic fiber with a noncircular crosssection. Crimped thermoplastic fibers can be obtained by appropriate adjusting of the shape of the spinneret, the air cooling conditions, the take-up speed, etc. By subjecting such fibers to heat treatment, or applying heat treatment simultaneously with drawing, fibers with the desired degree of crimp can be obtained. In addition, a crimp can be obtained with fibers of circular cross-section if two or more resins with different melt viscosities are employed and spinning is performed in such a manner that the cross-sections are of the side-by-side or eccentric sheath-core type. Such fibers possess sufficient crimp even immediately after spinning. Moreover, when such fibers are drawn, the crimp becomes even more pronounced. The degree of crimp of the fibers obtained in the manner described above should preferably be in the range from 1/ρ=0.1 to 1/ρ=30. The denotes the diameter (mm) of the helix formed by a fiber as a result of crimping. Furthermore, a crimp can be imparted to fibers by methods such as false texturing, the air stuffing box method, the steam stuffing box method, etc. When fibers are crimped by such mechanical methods, the desirable degree of crimp is such that the crimp number (CN) per unit length (25.4 cm) is between 10 and 500. Also, if fibers with a crimp contraction (cc) (to be defined below) of at least 5% are used, then the deterioration of crimp due to tension, etc., in the process of admixture with the continuous reinforcing fibers is comparatively reduced, and therefore commingled yarn with a comparatively better state of fiber commingling is obtained. The crimp number referred to above is that measured in accordance with JIS-L-1074.

The crimp contraction (cc) is measured in the following manner. First, 16 of the crimped filaments are combined into a single bundle, and while applying a tension of 0.1 g/d (d denotes denier) to the bundle, the latter is wound eight times around a reel of perimeter 1 m, then the reel is removed, thus forming a single skein of yarn. Five such skeins are prepared, and each of these skeins is immersed, under no tension, for 10 minutes in distilled water at 60–70° C., and after dewatering is dried for 30 minutes at 70° C. Next, each of the aforementioned skeins are immersed for 30 sec in water at 60° C. containing 2 g/l of a suitable wetting agent (surfactant), after which one place on the skein is fixed, and the skein is extended in the vertical direction by applying a load of 0.2 g/d. One minute later, the length of the skein is measured; this length is denoted by a. Then, the load is removed from the skein, and the skein is dried for 30 minutes at 60° C. under no tension. After drying, the skein is left for 60 minutes in a room at a temperature of 20° C. and a relative humidity of 65%. Then, a load of 0.002 g/d is applied, and 1 minute later the length of the skein is measured; this length is denoted by b. If the sum of the lengths a and the sum of the lengths b measured for the five skeins are denoted by A and B, respectively, then the crimp contraction is expressed by the following formula.

$$cc = 100 - \frac{B}{A} \times 100$$

Immediately after spinning, processing agents such as spinning oil, etc. , may be applied to the continuous thermoplastic fibers in order to improve the facility of combining filaments into, bundles, impart smoothness, prevent formation of static charge, or improve after-finishing properties. If such processing agents are added, then the amount of such agents should preferably be less than 0.4 parts by weight for 100 parts by weight of the continuous thermoplastic fibers. If such additives are not used at all, then the take up of the fibers after spinning may be difficult, due to generation of static charge, etc. Therefore, the addition of 0.1 to 0.3 parts by weight of the processing agents is recommended.

Continuous reinforcing fibers suitable for used in the present invention include glass fibers, carbon fibers, aramid fibers, etc. Glass fibers are particularly desirable.

In order to prevent damage to the fibers during spinning, improve processing efficiencies and enhance the degree of adhesion with the thermoplastic resin matrix, these continuous reinforcing fibers may be treated with processing agents such as lubricants coupling agents, etc. In such cases, the amount of processing agents used should preferably be in the range of 0.05 to 0.5 parts by weight for 100 parts by weight of the continuous reinforcing fibers. If the amount exceeds 0.5 parts by weight, then the mutual contiguity of the continuous reinforcing fibers tends to become excessive, thereby impeding adequate intermixture with the continuous thermoplastic fibers. On the other hand, if the quantity of processing agents used is less then 0.05 parts by weight, then the desired effects stated above are not adequate. Processing agents may be added to the continuous reinforcing fibers by conventional methods such as the roller method or the guide method, etc.

The commingled yarn should be formed by combining the aforementioned continuous thermoplastic fibers and the aforementioned continuous reinforcing fibers so that the fiber commingling parameter of the continuous reinforcing fibers is at least 20%. If the fiber commingling parameter of the continuous reinforcing fibers is less than 20%, then the impregnation of the continuous reinforcing fibers by the thermoplastic resin is difficult, hence the impregnation process requires considerable time and the resulting impregnation of the thermoplastic resin is inadequate. Consequently, undesirable patterns appear on the molded products, and the mechanical properties of the molded products deteriorate. The proportions in which the two types of fibers are commingled are not especially restricted, however, the content of reinforcing fibers should preferably be in the range from 20 to 70% by volume.

The methods which can be used to obtain a commingled yarn include a method of arranging the bundles of continuous reinforcing fibers and continuous thermoplastic fibers in parallel, opening the bundles electrically and linking the single filaments of the two bundles together; a method of arranging the bundles of continuous reinforcing fibers and continuous thermoplastic fibers in parallel, blowing air in the same direction an the fibers and thereby affecting the opening and interlacing of the two bundles (Taslan method); and a method of blowing air from the direction at right angles to the fiber and effecting the opening and interlacing of the fiber bundles in the resulting turbulent air currents (interlacing method).

The molding material for thermoplastic composites of the present invention may have the form of a thread composed of a single strand of the commingled yarn, or several strands of the commingled yarn, or may have the form of woven fabric, knitted fabric or multiaxial laminated fabric made by such thread. Suitable types of woven fabric include, for example, ordinary plain weave fabric, satin, interlock fabric, etc. As the woven fabrics, with comparatively little interlacing of warp and weft such as eight-harness satin are preferred. Also, so-called non-crimp woven fabrics, in which yarns of the present invention are used for the warp only, and fibers having extremely small diameter as compared with that of the warp (for example, of the order of 1/20 to 1/100 of the warp diameter) are used for the weft, are preferred. When such fabrics are to be made, the warp should preferably be introduced without twisting, provided this has no unduly adverse effects upon weavability. The aforementioned multiaxial laminated fabrics consist of layers, each comprising multiple threads aligned in a uniaxial direction within a single plans, with several such layers superimposed so that the threads in successive layers are oriented in different directions and integrated into a single sheet of fabric. This type of multiaxial laminated fabric can be obtained, for example, by superimposing several of the aforementioned layers so that the threads of successive layers are set at a certain angle to each other and finally stitching these layers together with thermoplastic resin yarn. Alternatively, several layers of the aforementioned yarn may be superimposed so that the yarns of the successive layers are oriented at angles of 0°, 45°, 90° and −45°, and the resulting quadriaxial laminate then stitched with thermoplastic resin yarn. In particular, stitching should preferably be done with yarn consisting of the same resin as that constituting the aforementioned continuous thermoplastic fibers. Since all the yarns in this type of multiaxial laminated fabric are arrayed linearly, the reinforcement effect is great when compared with plain weave fabrics, etc., wherein the constituent yarns are curved. Furthermore, in cases where the cloth is subjected to three-dimensional shaping, then, if this type of multiaxial laminated fabric is used, the angle between the yarn axes of successive layers can easily be varied, and the interval between yarns within individual layers can be arbitrarily widened. Thus, the aforementioned shaping process can easily be accomplished.

According to the method of the present invention, thermoplastic composites can be obtained by using the molding material obtained in the above. described manner either singly or superposed in several layers so arranged that the reinforcing fibers are multiaxially oriented, and then thermoforming the material at a temperature above the melting point of the continuous thermoplastic fibers. If this molding material for thermoplastic composites is used in thread form, then a multiplicity of the said threads are uniaxially aligned in a single plane, several thread layers obtained in this manner are superimposed in the same fashion as the multiaxial laminated fabric described above, and then thermoforming is performed. Even if the molding material for thermoplastic composites is used in the form of a woven or knitted fabric, several superposed layers of fabric should preferably be used so that the continuous reinforcing fibers are arranged with multiaxial orientations. Multiaxial laminated fabric may be used in either single or multiple superimposed layers. Applicable methods for thermoforming of multiaxial laminated fabric include a method of preheating the multiaxial laminated fabric to a temperature above the melting point of the continuous thermoplastic fibers and then press-forming while the material is being cooled, and a method of applying press-forming and heating simultaneously, etc. When multiaxial laminated fabric is press-formed while cooling, the pressing time must be adjusted so that the molten continuous thermoplastic fibers spread around the periphery of the continuous reinforcing fibers while maintaining appropriate fluidity, thereby ensuring a uniform overall distribution of constituents.

The pelletized molding material for thermoplastic composites of the present invention contains reinforcing fibers oriented in the longitudinal direction within a thermoplastic resin matrix. The content of reinforcing fibers is at least 20% by volume of the total volume of the pellet including the fibers. If this content were less than 20% by volume, then the desirable physical properties such as impact and fatigue resistance of the composite would be adversely affected. The content of reinforcing fibers are desirably to be 80% by volume, or less. If the content exceeds 80% by volume, then the amount of resin matrix will be unduly low and therefore the products will have a tendency to become brittle.

The dispersion rate of the reinforcing fibers contained in the pelletized molding material for thermoplastic composites of the present invention is at least 20%. If the dispersion rate of reinforcing fibers is less than 20%, the reinforcing fibers are not uniformly dispersed in the resin matrix, and consequently the strength of the composite will be low. Moreover, continuous reinforcing fibers will appear on the surface of the composite, and hence the smoothness of the surface will markedly deteriorate.

The microvoid density index of the molding material for thermoplastic composites of the present invention is at least 5, while the macrovoid density index of the material does not exceed 80. If the said microvoid density index were loss than 5, then the reinforcing fibers would be easily broken during the fabrication of the composite. If the macrovoid density index were greater than 80, which implies that numerous air bubbles (voids) would form in the molded product, then the flexural strength and other desired physical properties of the product would display marked adverse effects.

The reinforcing fibers applicable for use in this pelletized molding material for thermoplastic composites include glass fibers, carbon fibers, aramid fibers, etc. The thermoplastic resins suitable for the formation of the matrix include polypropylene, nylon 6, nylon 6,6, polyethylene terephthalate, polybutylene terephthalate, polyphenylsulfide, polycarbonate, polyether etherketone, etc. However, the resins applicable for this purpose are by no means limited to the above list.

The reinforcing fibers contained in the said pelletized molding material for thermoplastic composites are aligned in a prescribed direction (ordinarily the longitudinal direction). The length of these pellets of molding material for thermoplastic composites is from 3 to 60 mm. If the pellets are shorter than 3 mm, then the continuous reinforcing fibers contained in the pellets are unduly short, and consequently the impact resistance and other required physical properties of the composite will be inadequate. On the other hand, if the pellets are longer than 60 mm, then the feeding of the pellets to the extruder screw during the molding process will be difficult. The pellets should preferably be shorter than 20 mm. Such pellets can be prepared by aligning the continuous reinforcing fibers in the longitudinal direction, forming a rod-shaped molding with these fibers consolidated in the resin matrix, and then cutting this rod to the prescribed length. These rod-shaped moldings can be produced as indicated, for example, in Japanese Patent Publication No. 63-37694, i.e., by impregnating bundles of the continuous reinforcing fibers in a malt of the appropriate resin. However, if this method is used, then a pelletized molding material for thermoplastic composites with the required dispersion rate of at least 20%, microvoid density index of 5 or more and macrovoid density index not exceeding 80 is difficult to obtain. For example, if the impregnating time is prolonged in order to obtain a mixing dispersion ratio above 20% and a macrovoid density index below 80, then the microvoid density index is very likely to drop below 5.

Therefore, the pelletized molding material for thermoplastic composites of the present invention should preferably be prepared by using the above-mentioned commingled yarn composed of continuous reinforcing fibers and continuous thermoplastic fibers. According to this method, at least one commingled yarn composed of continuous thermoplastic fibers and continuous reinforcing fibers is used, this commingled yarn is heated to a temperature above that at which the continuous thermoplastic fibers melt and flow, and is compressed so that the thermoplastic resin is impregnated into the continuous reinforcing fibers to form a consolidated mass. The rod-shaped molding so obtained is then cut to the prescribed length to form the required pellets. The commingled yarn has a fiber commingling parameter of at least 20%, indicating a uniform state of commingling between the continuous thermoplastic fibers and the continuous reinforcing fibers, hence, pellets with a high commingling dispersion ratio and a macrovoid density index of 80 or less are easily formed. Moreover, a microvoid density index of at least 5 can be maintained by shortening the compression time when the continuous reinforcing fibers are impregnated with the thermoplastic resin. For example, the aforementioned compression time should not exceed 150 sec, and should preferably be 50 sec or less. Actually, if this commingled yarn is used and hot compression is applied so as to create a microvoid density index of 5 or more, then the dispersion rate of the pellets so obtained will necessarily be high, moreover, the macrovoid density index will not exceed 80. Therefore, by using the aforementioned commingled yarn, the pelletized molding material for thermoplastic composites of the present invention can be obtained with comparative ease and reliability.

An example of a method for manufacturing the said pellets using commingled yarn will be described in detail.

Preferably without twisting, for example, by using a rewind machine controlled to prevent twists of the yarn due to rewinding, one or several strands of the said commingled yarn are guided to an apparatus for molding rods. During this process, the tension imposed upon the commingled yarn is appropriately adjusted to minimize the ununiformity of the tension applied to yarn. If several strands of commingled yarn are used, then the tensions applied to each strand should be equalized. By this control, a satisfactory state of resin impregnation in the pellets is performed. Apparatuses for the formation of rods are shown in FIGS. 2 and 3, respectively.

Figure 2:
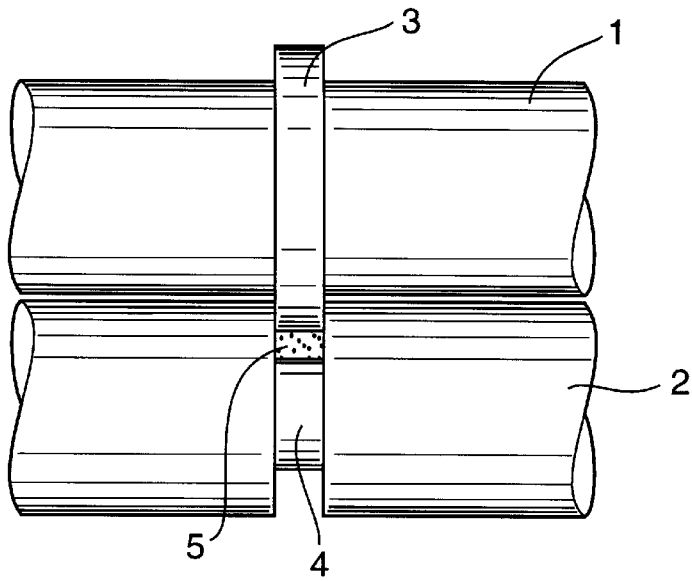
FIG. 2 is a front view of the forming apparatus with one pair of rollers for preparing the pelletized thermoplastic composite of the present invention.
Figure 3:
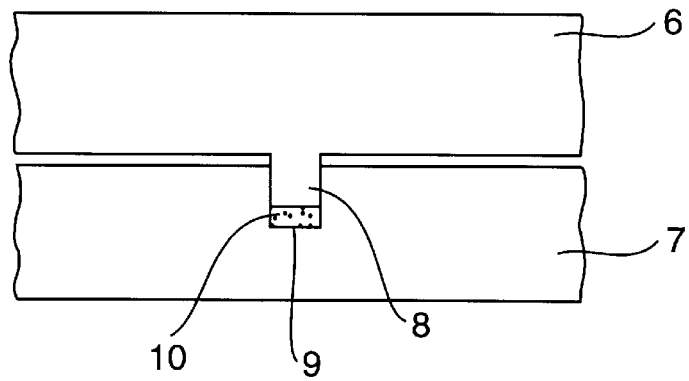
FIG. 3 is a front view of the forming apparatus with one pair of plates for preparing the pelletized thermoplastic composite of the present invention.

FIG. 2 shows a molding apparatus with a pair of rollers, 1 and 2. Roller 1 has a large diameter portion 3, while roller 2 has a small diameter portion 4. The rollers 1 and 2 are arranged in parallel so that the large diameter portion 3 engages with the small diameter portion 4. The commingled yarn 5 is fed into the gap between the large diameter portion 3 and the small diameter portion 4, and both rollers 1 and 2 are heated so as to raise the temperature of the commingled yarn above the temperature that is required for causing the thermoplastic fibers to melt and flow. When passing through the gap, the commingled yarn is compressed at an appropriate pressure. The microvoid ratio can be reduced by passing the commingled yarn 5 through not just one but a number of pairs of rollers. The commingled yarn 5 can be fed to the rollers by a belt, etc. The shape of the grooves in the rollers is determined in accordance with the desired shape of the pellets. If a forming apparatus with two or more pairs of convex rollers is used, then the rod-shaped molding may be formed by maintaining tension on the fibers while the yarn is successively passed between the said convex rollers.

Figure 4:
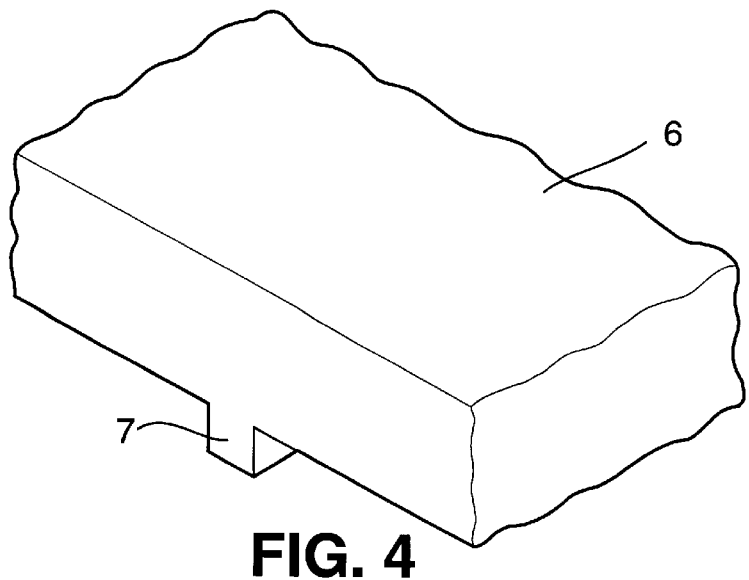
FIG. 4 is a perspective view of the plate with a protruding portion in the apparatus shown by FIG. 3.

The rod-shaped moldings can also be formed by pultrusion. FIG. 3 is a front view of an apparatus used for this pultrusion process. This apparatus has a plate 6 with a convex portion and a plate 7 having a groove 9 with which the said convex portion engages. FIG. 4 is a perspective view of the plate 6 with a convex portion shown in FIG. 3. The commingled yarn 10 consisting of continuous thermoplastic fibers and continuous reinforcing fibers passes through the gap between the convex portion 8 of plate 6 and the groove 9 of plate 7, and the said commingled yarn 10 is drawn while heated above the temperature which induces the malting and fluidity of the continuous thermoplastic fibers contained in the commingled yarn. This operation impregnates the continuous reinforcing fibers with the thermoplastic resin, forming a consolidated mass. In the above-mentioned process, the commingled yarn 10 is compressed between the convex portion 8 and the groove 9 at a constant pressure, and the commingled yarn is drawn through in this state. Devices such as far infrared heaters or near infrared heaters, etc., are preferably used as heat sources for the afore-mentioned rod-forming apparatus. Also, an atmosphere of heated nitrogen gas should preferably be provided in the interior of this apparatus in order to prevent oxidation of the resin when the continuous thermoplastic fibers have been melted. A nip roller can be provided between this apparatus and the commingled yarn rewind machine in order to regulate the feed rate of the commingled yarn.

Next, the rod-shaped molding obtained by the roller pressing and pultrusion methods described above should desirably be cooled and compressed by means of a roller, belt, plate, etc. This is performed in order to reduce the macrovoid density index by compression of the rod-shaped molding, since the volume of the resin reduces and macrovoid density index increases as a result of cooling. The thickness of the rod-shaped molding should preferably not exceed 1.5 mm. If the thickness is regulated in this manner, then when composites are fabricated using the pellets obtained by cutting these rods, the reinforcing fibers are less likely to break during the period between the introduction of the pellets into the extruder screw of the molding machine and the melting of the matrix resin. The pellets are obtained by cutting the rod-shaped molding obtained in this manner to lengths of 3–60 mm. The aforementioned rod-shaped molding should preferably be cut after it is received by a take-up apparatus and left to cool thoroughly, or alternatively, after being taken up, the rod-shaped molding may also be stored and then cut just prior to use.

The pelletized molding material for thermoplastic composites obtained in this manner is finally fabricated into thermoplastic composites by injection molding, extrusion molding, and the like.

EXAMPLES

The present invention will now be explained in more concrete detail with reference to the following examples.

Example 1

E-glass fibers with a monofilament diameter of 12 $\mu$m which had been surface-treated with processing agent such as a silane coupling agent were used as the continuous reinforcing fibers. By measurement of the ignition loss of these glass fibers, the amount of the processing agent applied was found to be 0.45 parts by weight per 100 parts by weight of the fibers.

Uncrimped polyethylene terephthalate fibers having a circular cross-section with a monofilament diameter of 18 $\mu$m were used as the continuous thermoplastic fibers. The orientation index after heat treatment and the thermal shrinkage ratio of these polyethylene terephthalate fibers were 0.95 and 5%, respectively.

A 5220 denier single strand of the afore-mentioned continuous reinforcing fibers and a 2250 denier single strand of the continuous thermoplastic fibers were combined into commingled yarn by the Taslan method. The volume fraction (Vf) of the E-glass fibers in this yarn was 55%. The yarn commingling conditions were as follows. The feed rate of the polyethylene terephthalate fibers was 0.3% greater than that of the glass fibers (i.e., overfeed ratio was 0.3%), the fluid pressure was 5 kg/cm$^2$, and the processing rate of the commingled yarn was 300 m/min. The fiber commingling parameter of the commingled yarn so obtained was 25%.

A number of strands of this commingled yarn were arrayed in parallel on a plane, placed in a mold, and heated for 2 minutes at 265° C. under a pressure of 55 kg/cm$^2$. Next, under the aforementioned pressurization conditions, the material was abruptly cooled so as to reduce the temperature to 40° C. after a lapse of 5 minutes. The molding so obtained was a reinforced plate with the fibers oriented in a single direction which is 15 mm in breadth, 120 mm in length and 3 mm in thickness. The flexural characteristics, interlaminar strength, Izod impact strength and melting energy of this plate were measured. The results obtained are shown in Table 1, along with the corresponding results for Example 2, Comparative Examples 1 and 2 (to be described below). The flexural strength, flexural modulus, and interlaminar strength were measured in accordance with JIS-K-7055, JIS-K-7056 and JIS-K-7057, respectively, while the Izod impact strength was measured in accordance with JIS-K-7110. The melting energy was calculated using the value Δ H (cal/g) measured from a 10 mg sample under an argon current with a differential scanning calorimeter (DSC-10A, manufactured by the Rigaku Denki Company, Ltd.) at a temperature increase rate of 20° C./min.

Example 2

A unidirectionally reinforced plate was prepared in the same manner as indicated in the description of Example 1, except that the thermal shrinkage ratio and orientation index after heat treatment of the polyethylene terephthalate fibers used in the present case were 15% and 0.50, respectively. The properties of this plate were evaluated in the same manner as in Example 1. The results are shown in Table 1.

Comparative Example 1

A unidirectionally reinforced plate was prepared in the same manner as in Example 1, except that the thermal shrinkage ratio and orientation index after heat treatment of the polyethylene terephthalate fibers used in the present case were 25% and 0.10, respectively. The properties of this plate were evaluated in the same manner as in Example 1. The results are shown in Table 1.

Comparative Example 2

A unidirectionally reinforced plate was prepared in the same manner as in Example 1, except that the fiber commingling parameter of the polyethylene terephthalate fibers used in the present case was 5%. The properties of this plate were evaluated in the same manner as in Example 1. The results are shown in Table 1.

TABLE 1

|  | Example 1 | Example 2 | Comparative Example 1 | Comparative Example 2 |
| --- | --- | --- | --- | --- |
| Composite | Unidirectionally reinforced plate | Unidirectionally reinforced plate | Unidirectionally reinforced plate | Unidirectionally reinforced plate |
| Thermal shrinkage ratio (%) | 5 | 15 | 25 | 5 |
| Orientation index after heat treatment | 0.95 | 0.50 | 0.10 | 0.90 |
| Fiber commingling parameter (%) | 25 | 25 | 25 | 5 |
| Flexural strength (kg/mm$^2$) | 97 | 95 | 87 | 85 |
| Flexural modulus (kg/mm$^2$) | 4800 | 4700 | 4500 | 4400 |
| Interlaminar strength (kg/mm$^2$) | 5.8 | 5.5 | 4.0 | 4.0 |
| Notched Izod impact strength (kgf · cm/cm$^2$) | 185 | 185 | 100 | 105 |
| Melting energy (cal/g) | 9.4 | 9.4 | 9.4 | 9.4 |

The following facts were established by the data shown in Table 1. That is, the plates prepared in both Examples 1 and 2 displayed superior mechanical properties as compared with the plates prepared in Comparative Examples 1 and 2, and moreover, displayed superior toughness. Furthermore, the surface smoothness of the moldings of Examples 1 and 2 was superior to that of the moldings prepared in Comparative Examples 1 and 2.

Example 3

E-glass fibers with a monofilament diameter of 16 μm and which had been surface-treated with processing agent such as a silane coupling agent were used as the continuous reinforcing fibers. By measurement of the ignition loss of these glass fibers, the amount of the processing agent applied was found to be 0.45 parts by weight per 100 parts by weight of the fibers.

Uncrimped nylon 6 fibers having a circular cross-section with a monofilament diameter of 16 μm were used as the continuous thermoplastic fibers. The thermal shrinkage ratio of these nylon 6 fibers was 5%.

A 8100 denier single strand of the aforementioned continuous reinforcing fibers and a 3640 denier single strand of the aforementioned continuous thermoplastic fibers were combined into commingled yarn by the Taslan method. The volume fraction (Vf) of the E-glass fibers in this yarn was 40%. In the process, the overfeed ratio of the nylon 6 was 0.4%, the fluid pressure was 4 kg/cm$^2$, and the processing rate of the commingled yarn was 300 m/min. The fiber commingling parameter of the commingled yarn so obtained was 20%.

By use of this commingled yarn, a unidirectionally reinforced plate was prepared in the same manner as in Example 1. The flexural strength, flexural modulus and Izod impact strength of this plate were measured, the results obtained being shown in Table 2, along with the corresponding results for Example 4 and Comparative Example 3 to be described below.

Comparative Example 3

A unidirectionally reinforced plate was prepared and the physical properties of this plate were evaluated in the same manner as in Example 3, except that the thermal shrinkage ratio of the nylon 6 fibers used in the present case was 20%. The results obtained are shown in Table 2.

Example 4

A unidirectionally reinforced plate was prepared in the same manner as in Example 3, except that nylon 6 fibers with the cross-section shown in FIG. 1 were used as the continuous thermoplastic fibers in the present case. Fibers with the noncircular cross-section illustrated in FIG. 1 above were prepared in the following manner. Nylon 6 was melt-spun under a cooling air current of 1 m/sec, then drawn to a ratio of 1.5 and heat-treated at 170° C. The resulting fibers were crimped, with 1/ρ=5. The fiber commingling parameter of the commingled yarn prepared in this manner was 42%. The physical characteristics of the unidirectionally oriented reinforced plate obtained using this commingled yarn are shown in Table 2.

TABLE 2

|  | Example 3 | Comparative Example 3 | Example 4 |
|---|---|---|---|
| Composite | Unidirectionally reinforced plate | Unidirectionally reinforced plate | Unidirectionally reinforced plate |
| Crimped/uncrimped | Uncrimped | Uncrimped | Crimped |
| 1/p | — | — | 5 |
| Thermal shrinkage ratio (%) | 5 | 20 | 10 |
| Fiber commingling parameter (%) | 20 | 10 | 42 |
| Flexural strength (kg/mm$^2$) | 108 | 99 | 112 |
| Flexural modulus (kg/mm$^2$) | 5600 | 4600 | 5800 |
| Notched Izod impact strength (kgf · cm/cm$^2$) | 240 | 160 | 255 |

The data displayed in Table 2 clearly demonstrate the following facts. That is, if thermoplastic fibers with a high thermal shrinkage ratio are used as in Comparative Example 3, then the fiber commingling parameter of the commingled yarn is lowered, and consequently the mechanical strength of the molded articles drops. Also, if crimped thermoplastic fibers are used as in Example 4, then commingled yarn with a high fiber commingling parameter is obtained, and therefore the molded articles display excellent mechanical strength.

Example 5

E-glass fibers with a monofilament diameter of 12 μm that were substantially untwisted and had been surface-treated with processing agent such as a silane coupling agent, were used as the continuous reinforcing fibers. By measurement of the ignition loss of these glass fibers, the amount of the processing agent applied was found to be 0.31 parts by weight per 100 parts by weight of the fibers.

Polyethylene terephthalate (PET) fibers with a monofilament diameter of 22 μm that were neither crimped nor twisted and were used as the continuous thermoplastic fibers. The orientation index after heat treatment and thermal shrinkage ratio of the PET fibers were 0.62 and 8.7%, respectively.

A 1620 denier single strand of the aforementioned continuous reinforcing fibers and a 1800 denier single strand of the aforementioned continuous thermoplastic fibers were rewound so that the fibers ware not twisted, and were combined into commingled yarn by the interlace method. The volume fraction (Vf) of the E-glass fibers in this yarn was 30%. In the process, the overfeed ratio of the polyethylene terephthalate fibers was 0.3%, the fluid pressure was 5 kg/cm$^2$, and the processing rate of the commingled yarn was 300 m/min. The fiber commingling parameter of the commingled yarn so obtained was 486%.

Fabric plain-woven from this commingled yarn was cut into 10×10 cm squares. Then, 24 of these cloth squares were superposed, introduced into a mold and pressurized under 15 kg/cm$^2$ at 280° C. for 3 minutes, thus obtaining a reinforced laminate 3 mm in thickness. This laminate was cut into samples of 15 mm wide which were tested for flexural strength and flexural modulus. The results of this tests are shown in Table 3, along with the corresponding results for Comparative Examples 4 and 5 (to be described below). Examination of the cross-sections of these test pieces with a scanning microscope revealed that the glass fibers were uniformly dispersed in the thermoplastic resin matrix, and that the resin had adequately permeated all the gaps between the glass fibers. Macroscopically, the test pieces were white in color.

Comparative Example 4

Commingled yarn was prepared in the same manner as in Example 5, except that in the present case, treated E-glass fibers were used in which the amount of the processing agent applied to the E-glass fibers was 0.6 parts by weight. The fiber commingling parameter of this commingled yarn was 15%. A plain weave fabric and reinforced laminate were obtained from this commingled yarn by the same procedure as in Example 5. The mechanical properties of this laminate were evaluated, with the results shown in Table 3. Examination of the cross-sections of these test pieces with a scanning microscope revealed that the glass fibers were unevenly clumped into aggregates within the thermoplastic resin matrix.

Comparative Example 5

Commingled yarn was prepared in the same manner as in Example 5, except that in the present case polyethylene terephthalate fibers treated with a polyether-type spinning oil (i.e., processing agent) were used. The amount of the processing agent applied was about 1.0 parts by weight per 100 parts by weight of the fibers. The fiber commingling parameter of this commingled yarn was 10%. A plain weave fabric and reinforced laminate were obtained from this commingled yarn by the same procedure as in Example 5. The mechanical properties of this laminate were evaluated, with the results shown in Table 3. Examination of the cross-sections of these test pieces with a scanning microscope revealed that the glass fibers were dispersed in some places but unevenly clumped into aggregates at other places within the thermoplastic resin matrix. Macroscopically, the test pieces were brown in color.

TABLE 3

|  | Example 5 | Comparative Example 4 | Comparative Example 5 |
|---|---|---|---|
| Amount of processing agent for E-glass fibers (parts by weight*) | 0.31 | 0.6 | 0.31 |
| Amount of processing agent for polyethylene terephthalate fibers (parts by weight*) | — | — | 1.0 |
| Orientation index after heat treatment | 0.62 | 0.35 | 0.35 |
| Thermal shrinkage ratio (%) | 6.7 | 8.7 | 8.7 |
| Fiber commingling parameter (%) | 48 | 15 | 10 |
| Flexural strength (kg/mm$^2$) | 51 | 37 | 32 |
| Flexural modulus (kg/mm$^2$) | 4700 | 3900 | 3750 |

*) Parts by weight per 100 parts by weight of the fibers.

As shown in Table 3, when a comparatively large amount of processing agent is applied to the reinforcing fibers and/or the thermoplastic fibers, the state of fiber commingling of the commingled yarn deteriorates and the mechanical strength of the molded articles diminishes.

Example 6

E-glass fibers with a monofilament diameter of 16 μm and surface-treated with a processing agent for polyesters, including a silane coupling agent, were used as the continuous reinforcing fibers. By measurement of the ignition loss of these glass fibers, the amount of the processing agent applied was found to be 0.35 parts by weight per 100 parts by weight of the fibers.

Uncrimped polyethylene terephthalate fibers with a monofilament diameter of 16 μm were used as the continuous thermoplastic fibers. The surface of the fibers were treated with a polyether-based spinning oil (i.e., processing agent), and the amount of the processing agent applied was 0.25 parts by weight per 100 parts by weight of the fibers. The orientation index after heat treatment and thermal shrinkage ratio of the PET fibers were 0.69 and 15%, respectively. These polyethylene terephthalate fibers were spun at a spinning speed of 4,500 m/min.

In the present case, the orientation index after heat treatment was calculated from the birefringence (Δn) measured with a Berek compensator (manufactured by the Leitz Company), in place of the degree of orientation (n).

Commingled yarn was formed by commingling a single 8100 denier strand of the aforementioned continuous reinforcing fibers and a single 4360 denier strand of the aforementioned continuous thermoplastic fibers with the following type of air nozzle. This air nozzle has a thread guide hole and three air jet holes located at positions trisecting the circle centered at the thread guide hole, and air jets are blown out at angles inclined 70° to the direction of the thread drawn out through the guide hole. During this process, the overfeed rate of the polyethylene terephthalate fibers was 0.4%, the fluid pressure was 5 kg/cm² and the processing speed of the commingled yarn was 100 m/min. The fiber commingling parameter of the commingled yarn so obtained was 32%.

By use of the commingled yarn obtained in the above manner, a multiaxial laminated fabric was prepared as follows. First, a number of strands of the aforementioned commingled yarn were aligned in the same plane, thus obtaining a layer with an areal density of 310 g/m². Four such layers were superposed so that the respective strands were mutually oriented at angles of 0°, 45°, 90° and −45°, then stitched with polyethylene terephthalate thread (300 denier, 108 filaments) to fasten the four layers together. Then, two of the multiaxial laminates so obtained were superposed and cut into 10×10 cm squares, which were compressed in a mold under a pressure of 0.87 MPa for 6 minutes at a temperature of 265° C. Then, while maintaining pressurization, the samples were rapidly cooled so that their temperature dropped to 40° C. after 5 minutes, thereby obtaining a quadriaxially reinforced laminate with a thickness of 2 mm. The flexural characteristics and impact strength of this laminate were determined in the same manner as in the Example 1, with the results shown in Table 4. The flexural characteristics were measured with respect to the axis oriented in the 0° direction.

Comparative Example 6

The same procedure was repeated as in Example 6, except that in the present case the orientation index after heat treatment of the polyethylene terephthalate fibers was 0.12, the amount of the processing agent applied was 0.7 parts by weight, and polyethylene terephthalate fibers that had been drawn after winding at a spinning speed of 1,300 m/min were used as the continuous thermoplastic fibers. The fiber commingling parameter of the commingled yarn so obtained was 15%. The physical properties of the quadriaxially reinforced laminate prepared from this commingled yarn are shown in Table 4. Macroscopically, this laminate was colored. As compared with molded laminates obtained in Example 6, a large melting energy was required in the present case.

TABLE 4

|  | Example 6 | Comparative Example 6 |
| --- | --- | --- |
| Amount of processing agent for polyethylene terephthalate fibers (parts by weight*) | 0.25 | 0.70 |
| Flexural strength (kg/mm²) | 65 | 60 |
| Flexural modulus (kg/mm²) | 2600 | 2500 |
| Notched Izod impact strength (kgf · cm/cm²) | 180 | 165 |
| Interlaminar strength (kg/mm²) | 5.8 | 4.9 |
| Melting energy (Cal/g) | 9.4 | 13.6 |

*) Parts by weight per 100 parts by weight of the fibers.

Example 7

E-glass fibers with a monofilament diameter of 12 μm and surface-treated with a processing agent for polyesters, including a silane coupling agent, were used as the continuous reinforcing fibers. By measurement of the ignition loss of these glass fibers, the amount of the processing agent applied was found to be 0.35 parts by weight per 100 parts by weight of the fibers.

Uncrimped polyethylene terephthalate fibers with monofilament diameter of 12 μm were used as the continuous thermoplastic fibers. The orientation index after heat treatment of these polyethylene terephthalate fibers were 1.07.

A 5250 denier single strand of the aforementioned continuous reinforcing fibers and a 2270 denier single strand of the aforementioned continuous thermoplastic fibers were combined into commingled yarn by the Taslan method. In the process, the overfeed ratio of the polyethylene terephthalate was 0.3%, the fluid pressure was 5 kg/cm², and the processing rate of the commingled yarn was 100 m/min. The fiber commingling parameter of the commingled yarn so obtained was 45%.

Six strands of this commingled yarn were heated to 230° C. in a hot air current at a velocity of 12 m/min while tension was applied continuously. Then, the yarn was heated to 280° C. with a far infrared heater in an atmosphere of nitrogen gas to melt the polyethylene terephthalate fibers. Then the heated yarn was compressed by two pairs of heated rollers of the type illustrated in FIG. 2 (with a roller gap of 2.5 mm in breadth), and then cooled and simultaneously compressed by consecutive passage through four pairs of cooled rollers, thereby obtaining a rectangular rod-shaped molding 1.1 mm thick and 2.5 mm wide. This rod-shaped molding was cut into pellets 10.0 mm in length. The dispersion rate of reinforcing fibers in the pellets so obtained was of 70%. The pellets had a microvoid density index of 12 and a macrovoid density index of 6.

These pellets were mixed at a weight ratio of 1:1.33 with pellets of diameter 2.5 mm and length of 8 mm obtained from the same source of polyethylene terephthalate as the aforementioned polyethylene terephthalate fibers. Next, this mixture was heated for 2 minutes at a mold temperature of 120° C. in an injection molding machine with a clamping force of 160 t, thereby forming of dumbbell shaped specimen.

The flexural modulus and notched Izod impact strength of the dumbbell shaped specimens so obtained were measured in accordance with JIS-K-7055 and JIS-K-7111, respectively. Also, after being subjected to 1,000,000 cycles of repetitive fatigue testing (JIS-K-7118), the flexural strength of these specimens was measured, and the values so obtained were recorded as the fatigue strength. Furthermore, the length of glass fibers in the dumbbell shaped specimen was measured. The results of these tests are shown in Table 5, together with the corresponding results for Examples 8–9 and Comparative Examples 7–9 (to be described below).

Example 8

The same procedure was repeated as in Example 7, except that in the present case crimped polyethylene terephthalate fibers with the cross-sectional view illustrated in FIG. 1 were used as the continuous thermoplastic fibers. The value of 1/ρ for these polyethylene terephthalate fibers was 18, and the fiber commingling parameter of the commingled yarn so obtained was 47%. Using this commingled yarn, a rectangular rod-shaped molding of thickness 2.2 mm and width 2.5 mm was obtained in the same manner as in Example 7, and this was cut into pellets of length 10.0 mm. The pellets thus prepared had a mixing dispersion ratio of 73%, a microvoid density index of 13 and a macrovoid density index of 15. The physical properties of the standard dumbbell shaped specimens formed from these pellets are shown in Table 5.

Example 9

The same procedure was repeated as in Example 7, except that in the present case the orientation index after heat treatment of the polyethylene terephthalate fibers was 0.7. The fiber commingling parameter of the commingled yarn so obtained was 23%. The dispersion rate of reinforcing fibers in the pellets obtained was 40%. The pellets had a microvoid density index of 35 and a macrovoid density index of 58. The physical properties of the standard dumbbell shaped specimens formed from these pellets are shown in Table 5.

Comparative Example 7

The same procedure was repeated as in Example 7, except that in the present case ten pairs of heated rollers with a linear speed of 0.3 m/min were used in the preparation of the rod-shaped moldings. The dispersion rate of reinforcing fibers in the pellets obtained was 85%. The pellets had a microvoid density index of 3 and a macrovoid density index of 2. The physical properties of the standard dumbbell shaped specimens formed from these pellets are shown in Table 5.

Comparative Example 8

The same procedure was repeated as in Example 7, except that in the present case three pairs of heated rollers with a linear speed of 0.3 m/min were used in the preparation of the rod-shaped moldings. The dispersion rate of reinforcing fibers in the pellets obtained was 10%. The pellets had a microvoid density index of 6 and a macrovoid density index of 80. The physical properties of the standard dumbbell shaped specimens formed from these pellets are shown in Table 5.

Comparative Example 9

Pellets were prepared by the following conventional method. First, glass fibers and a polyethylene terephthalate resin were commingled with a weight ratio of 0.3:0.7, and this mixture was pelletized by the ordinary method, thereby obtaining pellet-shaped moldings of diameter 2.5 mm and length 8.0 mm. Then, using the above-mentioned type of injection molding machine with 160 t clamping force, standard dumbbell shaped specimens of the same form as indicated above were obtained from these pellets and the physical properties of these specimens were evaluated. The results are shown in Table 5.

TABLE 5

| | Example 7 | Example 8 | Example 9 | Comparative Example 7 | Comparative Example 8 | Comparative Example 9 |
|---|---|---|---|---|---|---|
| Dispersion rate (%) | 70 | 73 | 40 | 65 | 10 | |
| Microvoid density index | 12 | 13 | 35 | 3 | 6 | |
| Macrovoid density index | 6 | 15 | 58 | 2 | 60 | |
| Flexural modulus (GPa) | 14 | 15 | 14 | 12 | 12 | 12 |
| Notched impact strength (kgf · cm/cm$^2$) | 33 | 35 | 30 | 24 | 20 | 14 |
| Fatigue strength (μPa) | 125 | 137 | 118 | 94 | 80 | 46 |
| Length of E-glass fibers (mm) | 2.5 | 3.0 | 2.1 | 1.4 | 1.3 | 0.15 |

The data in Table 5 clearly show that articles molded from pellets prepared in accordance with the method of the present invention contain longer continuous reinforcing fibers and possess superior physical properties.

Example 10

E-glass fibers with a monofilament diameter of 12 μm and surface-treated with a processing agent for nylon 6, including a silane coupling agent, were used as the continuous reinforcing fibers. The amount of the processing agent applied was 0.28 parts by weight per 100 parts by weight of the fibers.

Uncrimped nylon 6 fibers with a monofilament diameter of 16 μm were used as the continuous thermoplastic fibers. The orientation index after heat treatment and thermal shrinkage ratio of these nylon 6,6 fibers were 0.83 and 8.7%, respectively.

A 2625 denier single strand of the aforementioned continuous reinforcing fibers and a 6125 denier single strand of the aforementioned continuous thermoplastic fibers were combined into commingled yarn and pellets were prepared in the same manner as in Example 7.

The dispersion rate of reinforcing fibers in the pellets so obtained was 66%. The pellets had microvoid density index of 17 and a macrovoid density index of 40. Standard dumbbell shaped specimens were obtained from these pellets by the same procedure as in Example 7. The flexural modulus and notched Izod impact strength of these dumbbell shaped specimens were measured at a temperature of 20° C. and a relative humidity of 50% by the same methods as used in Example 7. The results of these tests are shown in Table 6, along with the corresponding results for Comparative Example 10 (to be described below).

Comparative Example 10

The same type of glass fibers and the same type of nylon fibers as were used in Example 10 were commingled in the weight ratio of 0.3:0.7, and this mixture was pelletized in the conventional manner, thereby obtaining pellets of diameter 2.5 mm and length 8.0 mm. Dumbbell shaped specimens were obtained from these pellets by the same procedure as in Example 10, and the physical properties of these specimens were evaluated, with the results shown in Table 6.

TABLE 6

|  | Example 10 | Comparative Example 10 |
|---|---|---|
| Flexural modulus (GPa) | 14 | 10 |
| Notched impact strength (kgf · cm/cm$^2$) | 52 | 18 |

As shown by the data in Table 6, the dumbbell shaped specimens of Example 10 obtained using pelletized molding material of the present invention had higher flexural moduli and greater notched impact strength than the corresponding specimens prepared by conventional methods.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A molding material for thermoplastic composites prepared from a commingled yarn containing continuous thermoplastic fibers and continuous reinforcing fibers, in a form of threads, textile fabrics, knitted fabrics, or multiaxial laminated fabrics, wherein each of said continuous thermoplastic fibers is a crimped fiber, and orientation index after heat treatment of said continuous thermoplastic fibers is 0.3 or more, the thermal shrinkage ratio of said continuous thermoplastic fibers is 15% or less, and the fiber commingling parameter of said continuous reinforcing fibers in said commingled yarn is 20% or more.

2. A molding material for thermoplastic composites according to claim 1, wherein to 100 parts by weight of said continuous reinforcing fibers, 0.05 to 0.5 parts by weight of a processing agent are applied, said processing agent preventing damage to said continuous reinforcing fibers during spinning, improving processing efficiencies, and enhancing the degree of adhesion with the thermoplastic resin matrix.

3. A molding material for thermoplastic composites according to claim 1, wherein said continuous thermoplastic fiber is a polyester fiber or polyamide fiber.

4. A molding material for thermoplastic composites according to claim 1, wherein said continuous reinforcing fiber is a glass fiber.

5. A pelletized molding material for thermoplastic composites comprising a thermoplastic resin matrix and continuous reinforcing fibers dispersed therein, said molding material being prepared from a commingled yarn containing continuous thermoplastic fibers and continuous reinforcing fibers; wherein each of said continuous thermoplastic fibers is a crimped fiber; the orientation index after heat treatment of said continuous thermoplastic fibers is 0.3 or more; the thermal shrinkage ratio of said continuous thermoplastic fibers is 15% or less; the fiber commingling parameter of said continuous reinforcing fibers in said commingled yarn is 20% or more; said continuous fibers are aligned in the longitudinal direction of said pellet; said continuous reinforcing fibers are contained in said pellet at a rate of 30% by weight or more based on the total weight of said pellet; the dispersion rate of said continuous reinforcing fibers is 20% or more; the microvoid density index of said pellet is 5 or more; the macrovoid density index of said pellet is 80 or less; and the length of said pellet in the longitudinal direction is 3 to 60 mm.

6. a pelletized molding material according to claim 5, which is prepared by heating a plurality of strands composed of at least one said commingled yarn so that said thermoplastic fibers are melted, and then cutting the resulting material to the prescribed dimension after said thermoplastic resin is solidified.

7. A pelletized molding material according to claim 6, wherein to 100 parts by weight of said continuous reinforcing fibers, 0.05 to 0.5 parts by weight of a processing agent are applied, said processing agent preventing damage to said continuous reinforcing fibers during spinning, improving processing efficiencies, and enhancing the degree of adhesion with the thermoplastic resin matrix.

8. A pelletized molding material according to claim 6, wherein said continuous thermoplastic fiber is a polyester fiber or a polyamide fiber.

9. A method for preparing thermoplastic composites by the use of a molding material of claim 1, comprising the steps of, arranging at least one of said molding materials so that said continuous reinforcing fibers are mutually oriented in a multiaxial manner, and thermoforming said material at a temperature above the melting point of said continuous thermoplastic fibers therein.

10. A molding material for thermoplastic composites according to claim 2, wherein said processing agent is at least one selected from the group consisting of a lubricant and coupling agent.

11. A pelletized molding material according to claim 6, wherein said processing agent is at least one selected from the group consisting of a lubricant and coupling agent.

12. A method according to claim 9, wherein said molding material further contains 0.05 to 0.5 parts by weight of a processing agent for 100 parts by weight of said continuous reinforcing fibers, said processing agent preventing damage to said continuous reinforcing fibers during spinning, improving processing efficiencies, and enhancing the degree of adhesion with the thermoplastic resin matrix.

13. A method according to claim 12, wherein said processing agent is at least one selected from the group consisting of a lubricant and coupling agent.

14. A method according to claim 9, wherein said continuous thermoplastic fiber is a polyester fiber or a polyamide fiber.

15. A method according to claim 9, wherein said continuous thermoplastic fiber is a glass fiber.

* * * * *